Patented May 22, 1934

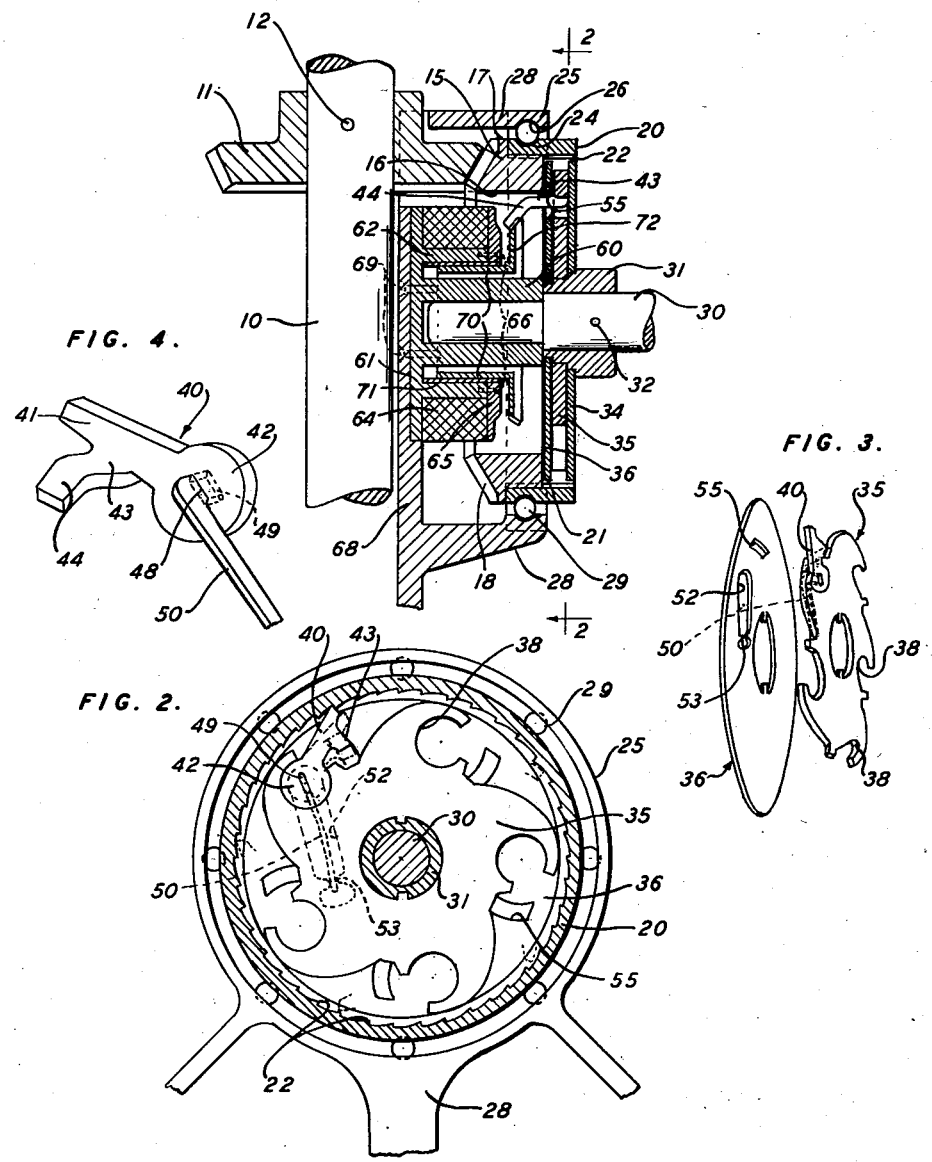

1,960,004

UNITED STATES PATENT OFFICE 1,960,004

POWER TRANSMITTING MECHANISM

Erwin E. Franz, Cranford, N. J., assignor to Western Electric Company, Incorporated, New York, N. Y., a corporation of New York Application January 7, 1932, Serial No. 585,181

6 Claims. (Cl. 192—47)

This invention relates to power transmitting mechanism and particularly to clutches for the operation of sequence switches in automatic telephone systems.

An object of the invention is to provide an improved clutch mechanism that is positively engageable.

In the preferred embodiment of the invention, a positive clutch mechanism operatively responsive to the closure of an electrical circuit includes a driven gear rotatable upon a suitable support and meshing with a driving gear. The driven gear carries a ring that is internally toothed, and mounted concentrically within the ring on a hub that is fixed to a shaft is a disc which carries pawls that are engageable with the teeth in the ring for rotating the shaft. The pawls are normally kept out of engagement with the teeth by means of springs, and electromagnetic means are provided for causing the pawls to engage the teeth.

Other features and advantages of the invention will become apparent from the following detailed description of one embodiment thereof, reference being had to the accompanying drawing, wherein Fig. 1 is a sectional view of the power transmitting mechanism constructed in accordance with the invention;

Fig. 2 is a sectional view on a line 2—2 of Fig. 1;

Fig. 3 is a schematic perspective of two of the discs, and

Fig. 4 is a perspective of a pawl and spring.

Referring now to the drawing, wherein like reference numerals are employed to designate like portions throughout the several views, in Fig. 1 the numeral 10 designates a shaft rotatably supported in suitable bearings (not shown), and driven continuously at a predetermined constant speed by any suitable driving mechanism, such as an electric motor (also not shown). A bevel gear 11 is fixed to the shaft by convenient means such as the pin 12, and is rotated by the shaft. Mounted to rotate on an axis at an angle to the axis of rotation of the gear 11 is another bevel gear 15 meshing with the gear 11.

As shown in Figs. 1 and 2, the gear 15 is an annular member having substantially cylindrical inner and outer surfaces 16 and 17 respectively, and a toothed face 18, and may be die cast of any suitable alloy. Closely engaging a portion of the outer cylindrical surface 17 of the gear 15, so as to be rotatable therewith, is an annular member 20, preferably of steel tubing, pressed or molded onto the outer surface of the gear. The annular member is wider than the outer cylindrical surface 17 of the gear 15, and is permitted to extend out beyond the rear or untoothed face 21 of the gear. The annular member 20 is provided with ratchet teeth 22 extending across the inner cylindrical surface thereof, and a portion of each tooth is embedded in the surface of the gear, to prevent slippage between the gear and the member, and the portions of the teeth in the extended portion of the member are engageable with pawls, as will hereinafter be described.

The member 20 is provided, in the outer surface of the portion that engages the gear 15, with a peripheral groove 24, the transverse contour of which is arcuate. A ball race 25 which is provided with a similar internal arcuate groove 26 is mounted in a support 28 so that the two grooves are aligned. A plurality of steel balls 29 positioned and retained in the two cooperating grooves maintain the gear 15 in concentric position with respect to the ball race, and afford anti-frictional support for the rotatable gear.

The gear 15 is intended to rotate a shaft 30, which is mounted concentrically of the gear 15 in suitable bearings and which extends through the axial opening in the gear and terminates in front of the toothed face 18 thereof. The shaft 30 is intended to operate and form a part of a sequence switch, which may be of any suitable type, such for example, as shown in United States Patent No. 1,127,808 issued to J. N. Reynolds and C. F. Baldwin February 9, 1915, in which a corresponding shaft 7 is shown. A hub 31 which extends into the cylindrical space enclosed by the extended portion of the annular member 20, and which terminates substantially in the plane of the rear face 21 of the gear 15, is fixed to the shaft 30 by any suitable means such as the pin 32. The hub is provided with annular recesses in which are positioned three discs 34, 35, 36, which are rigidly mounted in close juxtaposition upon the hub by any suitable means such as staking.

The disc 34, which is the one farthest from the toothed face of the gear 15, is a flat circular member, substantially flush with the outer end of the extended portion of the annular member 20, and is of sufficient diameter to leave only a small clearance for the teeth 22. The disc 35, as shown in detail in Figs. 2 and 3 is a flat member arranged to pivotally receive and retain a plurality of pawls, in the present embodiment, five pawls. The member 35 may be described as a circular disc, from the edge of which, at a plurality of points, portions have been cut away to permit pawls to be positioned in the plane of the disc, and in addition, circular apertures 38 have been made in the disc overlapping the cutaway portions, whereby the apertures are in communication with the cutaway portions, the width of the path of communication being less than the diameter of the circular aperture. It is thus apparent that a circular member positioned and rotatably retained in the aperture 38 would be prevented from lateral displacement, in spite of the break in the wall of the aperture.

Each of the apertures 38 has positioned therein a pawl 40, shown in perspective in Fig. 4, which consists of an arm 41 having a substantially circular portion 42 at one end thereof, and a tongue 43 extending outwardly transversely of the arm 41 and terminating in an obliquely bent portion 44. The circular portion 42 of the pawl has a non-circular and preferably a polygonal hole 48 in which is retained in any suitable manner a similarly shaped end 49 of a flat strip spring 50. When the pawls 40 are in position in the apertures 38 of the disc 35, the arms 41 lie in the spaces provided by cutting away portions of the edge of the disc. The circular portions 42 of the pawls are rotatable in the apertures 38 of the disc 35, and the arms 41 are thus movable angularly, and the break in each of the apertures through which the arm of the pawl passes is of sufficient width to permit the angular movement of the arm. The strip springs lie adjacent to the surface of the disc and substantially parallel thereto, and tend to move angularly with the movement of the pawl. The springs 50 and the tongues extend from the side of the disc that is toward the shaft 10.

The disc 36 is mounted on the hub so as to closely engage the side of the disc 35 from which the tongue 44 and spring 50 extend. It is a flat circular disc of substantially the same diameter as disc 34. It is provided with elongated apertures 52 in which the springs 50 may be disposed. Each of the apertures 52 has a narrow portion near the free end of the spring formed by two projections 53 in the disc at opposite sides of the aperture. The free end of the spring is disposed between these projections and lateral movement of that end of the spring is thereby prevented. The disc 36 is also provided with apertures 55 through which the tongues 43 of the pawls may extend, and these apertures may be of any convenient shape, and must be of sufficient size to permit a tongue to move freely as its pawl rocks within the disc 35. The discs 34 and 36, by being positioned on either side respectively of the disc 35, and in close engagement with it, retain the pawls in their apertures, and no additional retaining means are required.

As shown in Fig. 1, the end of the shaft 30 is rotatably supported in a stationary bearing 60 which has integral therewith a flange 61. The flange 61 has integral therewith, an annular portion 62 which is concentric with the bearing 60 and spaced therefrom, and which supports a winding 64 of an electromagnet. A centrally apertured disc 65 which is secured to the end of the annular portion 62 of the flange 61 by any suitable means such as screws 66 retains the winding 64 on annular support 62 A supporting member 68, which may be integral with the supporting member 28, or may be secured thereto in any conventional manner, supports the bearing 60 and its integral flange 61 by any suitable means such as screws 69.

The armature 70 of the electromagnet is a cylindrical sleeve which is disposed in the annular space between the bearing 60 and the coil support 62. A sleeve 71 of non-magnetic material is closely interposed between the coil support 62 and the armature, and serves the double purpose of preventing a short in the magnetic circuit, and of slidably and rotatably supporting the armature. The armature is provided with a flange 72 disposed in the space between the disc 36 and the coil retaining disc 65, and the flange has its outer edge formed obliquely to the main body of the flange, and substantially parallel to the oblique portion 44 of the tongue 43 carried by the pawl 40. The tongue 43 is of sufficient length and the flange 72 is of sufficient diameter that the flange is at all times disposed between the disc 36 and the end of the tongue, irrespective of the disposition of the pawl.

In operation, the shaft 10, gear 11, and the gear 15 are being driven from a suitable source of motive power. The electro-magnet is associated with any suitable electrical circuit (not shown) which includes a source of electromotive force and a circuit closing device. When the electrical circuit is open, the electromagnet is de-energized, and no force is exerted on the armature. The pawls are then drawn away from the ratchet teeth as shown in broken lines in Fig. 2, and they are maintained in this position by the springs 50. None of the pawls are in engagement with the ratchet teeth, and the discs 34, 35, and 36, and the shaft 30 are stationary.

When the electromagnet is energized by completion of the electrical circuit, the armature 70 is drawn axially toward the winding 64, which causes displacement of the flange 72 in the same direction. The obliquely formed portion of the flange bears against the oblique portions of the tongues 43, and moves the tongues toward the annular member 20, which moves the pawls angularly to bear against the ratchet teeth, which movement is unsuccessfully opposed by the attendant distortion of the flat springs 50. As the ratchet teeth are carried around by the rotation of the gear 15, the end of each pawl is approached by the pawl engaging surface of a tooth. However, there is a differential relationship between the spacing of the pawls on the disc 35 and the spacing of the teeth on the member 20, so that only one pawl may operatively engage the annular member 20 at a time. When the end of one pawl is in operative engagement with a tooth, the ends of the other pawls are at varying distances from the pawl engaging surfaces of the teeth with which they are aligned, as indicated in Fig. 2. It is apparent that when the electromagnet is actuated, all of the pawls are placed in alignment with ratchet teeth, but that only one will establish a driving connection between the gear 15 and the shaft 30. This arrangement of the pawls provides substantially instantaneous driving connection between the gear and the shaft. There can be no appreciable time interval between the movement of the pawls into the path of the teeth and operative engagement of a pawl with a tooth, because the differential spacing renders it impossible for the gear 15 to move an appreciable distance independently of the discs after outward movement of the pawls.

The operative connection between the driving and driven elements continues as long as the electromagnet remains energized. As soon as the electromagnet is de-energized, all of the springs 50, which have been exerting a restoring force in opposition to the magnetic attraction exerted upon the armature, will cause the pawls to return to their inoperative positions. The tongues 43 will thus press inwardly upon the obliquely formed edge of the armature flange, and will retract the armature.

As stated above, the apparatus hereinbefore described is applicable especially to the operation of sequence switches in automatic telephone systems. In that use, the closing of an electrical circuit which forms a part of the system produces energization of the electromagnet which operates to complete a driving connection between a rotatable member and the sequence switch shaft. However, the apparatus is adaptable to wide and varied use, and may be employed with either manual or automatic control in many types of mechanisms where non-continuous rotation of a machine element is desired.

While a single embodiment of the invention has been described and illustrated, it is to be understood that it is capable of many variations and modifications within the scope of the appended claims.

What is claimed is:

1. In a power transmitting mechanism, a driving element, a member carried by the driving element and provided with internal teeth, a shaft, a plurality of discs fixed to the shaft, a pawl carried by one of the discs and confined therein by and having a tongue extending through an aperture in another of the discs, and means to engage the tongue for moving the pawl into engagement with a tooth of the toothed member to impart rotation to the shaft.

2. In a power transmitting mechanism, a driving element, a member carried by the driving element and provided with teeth, a shaft, a plurality of discs fixed to the shaft, a plurality of pawls carried by one of the discs in differentially spaced arrangement with respect to the teeth of the toothed member, to permit any one and only one of the pawls to transmit motion from the toothed member to the shaft, the pawls being confined in the pawl carrying disc by another of the discs and each pawl having a tongue extending through an aperture in the confining disc and means to engage the tongues for moving the pawls into the path of the teeth.

3. In a power transmitting mechanism, a rotatable driving element, a member carried by the rotatable element and provided with teeth, a rotatable shaft, a plurality of discs fixed to the shaft, a pawl carried by one of the discs and confined therein by another of the discs and having a tongue extending through an aperture in the confining disc, resilient means for normally maintaining the pawl out of the path of the teeth, and electromagnetic means engageable with the tongue for rocking the pawl into the path of the teeth.

4. In a power transmitting mechanism, a rotatable driving element, an internally toothed member carried by the rotatable element, a shaft, a disc fixed to the shaft and supporting a plurality of pawls, a second disc fixed to the shaft to confine the pawls in place in the supporting disc, a tongue on each pawl extending through a corresponding aperture in the confining disc, a spring carried by each pawl for normally maintaining the pawls out of engagement with the toothed member, and electromagnetic means engageable with the tongues for rocking the pawls into engagement with the member.

5. In a power transmitting mechanism, a driving member, a rotatable shaft, an apertured member mounted thereon, a pawl pivotally mounted in an aperture in the member, and having a laterally extending tongue and a spring, and a disc mounted on the shaft on each side of the apertured member, one of the discs having apertures for clearing the tongue and spring of the pawl.

6. In a clutch, a toothed element, and a member for intermittent coaction therewith comprising a disc, a pawl mounted therein having a laterally extending tongue and a spring, a second disc having an aperture through which the tongue extends and means to engage the spring for yieldably retaining the pawl out of engagement with the toothed element, and means engageable with the tongue to move the pawl into engagement with the toothed element.

ERWIN E. FRANZ.